No. 644,122. Patented Feb. 27, 1900.
M. BATEMAN & W. ZIMMERMAN.
POTATO BUG GATHERER.
(Application filed May 3, 1898. Renewed July 25, 1899.)
(No Model.)
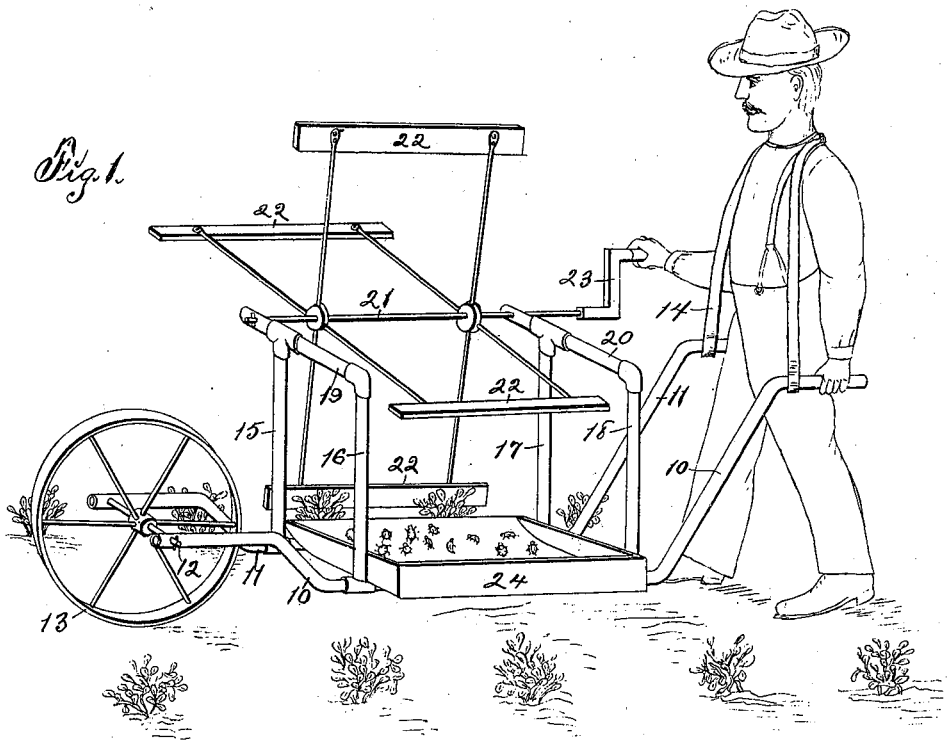
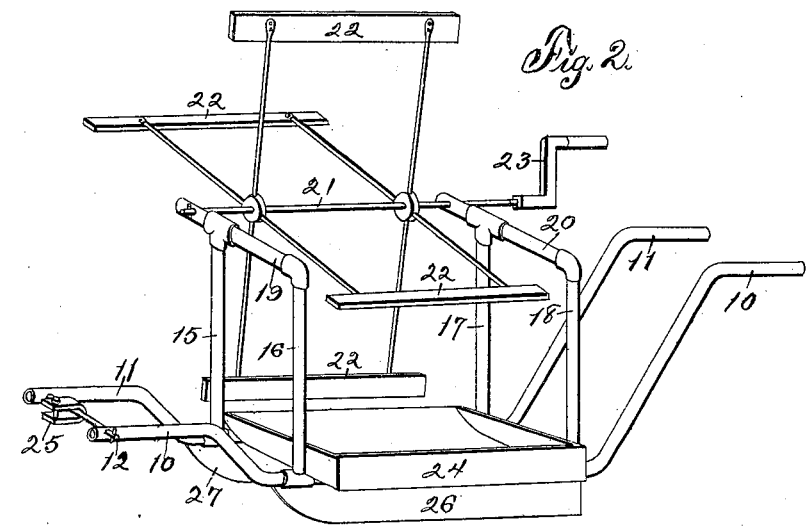
Witnesses:
Jas. Barels.
J. Ralph Orwig.
Inventors.
Miles Bateman
William Zimmerman
By J. C. Sweet
Att'y.

UNITED STATES PATENT OFFICE.

MILES BATEMAN AND WILLIAM ZIMMERMAN, OF LONE TREE, IOWA; SAID BATEMAN ASSIGNOR TO SAID ZIMMERMAN.

POTATO-BUG GATHERER.

SPECIFICATION forming part of Letters Patent No. 644,122, dated February 27, 1900.

Application filed May 3, 1898. Renewed July 25, 1899. Serial No. 725,096. (No model.)

*To all whom it may concern:*

Be it known that we, MILES BATEMAN and WILLIAM ZIMMERMAN, citizens of the United States of America, and residents of Lone Tree, in the county of Johnson and State of Iowa, have invented a new and useful Potato-Bug Harvester, of which the following is a specification.

The object of this invention is to provide improved means and mechanism for gathering from the tops of potato-plants those insects commonly and ordinarily termed "potato-bugs," and which if left upon the plants cause damage thereto of material importance to those engaged in the occupation of raising potatoes.

This invention consists in the combination of a truck or drag arranged for travel parallel with a row of plants, a receptacle mounted on said truck or drag, and a reel carried by the truck or drag and arranged for rotation in an orbit transversely of the line of advancement of the device in successive engagement with the plants of the row, which reel is so located as that its orbit intersects the vertical plane of the receptacle on the truck or drag.

This invention consists, further, in the construction, arrangement, and combination of elements hereinafter set forth, pointed out in our claims, and illustrated by the accompanying drawings, in which—

Figure 1 is a perspective showing the complete device in position for practical use. Fig. 2 is a perspective showing a modified form of the device arranged for animal draft and manual actuation and guidance.

In the construction of the device as shown in Fig. 1 the numerals 10 11 designate curved side frames having horizontal body portions, upwardly and forwardly extending front end portions, upwardly and rearwardly extending rear portions, and handles fixed to and extending horizontally from the rear end portions. The side frames 10 11 preferably are made of gas-pipe and carry a shaft or axle 12 in their forward ends, which axle is positioned transversely of and connects said forward ends of the side frames. A supporting-wheel 13 is mounted on the shaft or axle 12 between the side frames. A shoulder-strap 14 is connected at its ends to the handles of the side frames 10 11 and is so shaped, of such length, and so arranged as to be passed over the shoulders and at the rear of the neck of the man operating the device and suspend the side frames, conjunctively with the wheel 13, free, clear, and above the ground. Standards 15, 16, 17, and 18 are arranged in pairs at desired distances of separation and vertically rise from the horizontal portions of the side frames 10 11, being connected at their lower ends to said side frames. The standards 15 16 on the side frames 11 10, respectively, are connected at their upper ends by a bar 19, which bar projects laterally to the right of the standard 15 and has a journal-bearing on the extremity thereof. The standards 17 18, respectively, on the side frames 11 10 of the device are connected at their upper ends by a bar 20, which bar extends laterally to the right of the standard 17 and has a journal-bearing in the extremity thereof in alinement with the journal-bearing on the extremity of the bar 19. The standards 15, 16, 17, and 18 and bars 19 20 preferably are made of gas-pipe and connected with each other and with the side frames by ordinary T's and elbows. A reel-shaft 21 is mounted in the journal-bearings on the extremities of the bars 19 20 and extends to the rear of the bar 20. A reel 22 is mounted on the reel-shaft 21, and a crank 23 is mounted on the rear end of said reel-shaft and is so positioned and located relative to the handles of the machine as readily and conveniently to be engaged by the right hand of the man operating the machine in the position shown in Fig. 1.

The journal-bearings on the bars are located in such relations to the side frame 11 as that the implement may be advanced along the side and to the left of a row of plants, as illustrated, and the reel-shaft 21 will be vertically above the said row of plants, and in the advancement of the machine and the manual rotation of the shaft 21 by means of the crank 23 the reel will engage with the successive plants of the row, and in such movement will agitate, shake, and oscillate said plants to such an extent as to remove therefrom the insects of the character hereinbefore mentioned.

A receptacle 24 is mounted on the horizontal portions of the side frames 10 11 between the pairs of standards and extends transversely thereof, with its right edge or side in close relation to the row of plants being acted upon. The receptacle 24 is open at the top, and when the reel 22 is operated to knock, shake, or remove the insects from the plants said insects will fall or be forced into the receptacle, wherefrom they may be removed and destroyed as desired by the operator.

In the modification shown in Fig. 2 the wheel 13 is removed and a clevis 25 substituted therefor, by means of which clevis attachment may be had to the harness of a draft-animal for the purpose of advancing or drawing the implement along the surface of the ground. In this form of device runners 26 27 are attached to the side frames 10 11 and the shoulder-strap 14 is removed from the handles, the weight of the device being carried on the runners, which are guided in their forward movement by the application of manual force by the operator to the handles of the side frames. When animal-power is employed to draw the device constructed as shown in Fig. 2, the operator may easily, readily, and conveniently guide the implement in its advancement by the use of his left hand only and employ his right hand to manipulate the crank 23 to the rotation of the shaft 21 and operation of the reel 22.

We claim as our invention—

1. The combination of the side frames made of gas-pipe and formed with the depressed central portions, the upwardly and forwardly extending end portions having journal-bearings in the extremities thereof and the upwardly and rearwardly extending end portions having the handles attached thereto or formed thereon, the receptacle mounted on and connecting the depressed central portions of the side frames, the standards 15, 16, 17 and 18, also made of gas-pipe and rising from the side frames adjacent the corners of the receptacle, the bars horizontally mounted on and connecting the upper ends of the standards and laterally extended from the standards 15 and 17, the journal-bearings formed in the laterally-extending portions of the bars, a reel-shaft mounted for rotation in the bearings on the bars, the crank on the rear end of said shaft, the reel on the central portion of the shaft, and the supporting-wheel mounted between the forward end portions of the side frames and journaled thereto.

2. The combination of side frames, a wheel intersecting the forward ends of said side frames, handles on the rear ends of said side frames, a receptacle on the central portions of said side frames, standards rising from said side frames, bars on said standards, a shaft journaled in said bars, a crank on said shaft, a reel on said shaft between the bars, and a shoulder-strap connected with and connecting said handles.

MILES BATEMAN.
WILLIAM ZIMMERMAN.

Witnesses:
JOHN W. JAYNE,
A. N. KALB.